April 8, 1924.
M. LEBEIS
1,489,535
DEVICE FOR THE AUTOMATIC OPERATION OF TYPEWRITERS AND THE LIKE
Filed June 4, 1923
Fig. 1.
| a = 1 | f = 6  | l = 11 | q = 16 | v = 21 |
|-------|--------|--------|--------|--------|
| b = 2 | g = 7  | m = 12 | r = 17 | w = 22 |
| c = 3 | h = 8  | n = 13 | s = 18 | x = 23 |
| d = 4 | i = 9  | o = 14 | t = 19 | y = 24 |
| e = 5 | k = 10 | p = 15 | u = 20 | z = 25 |
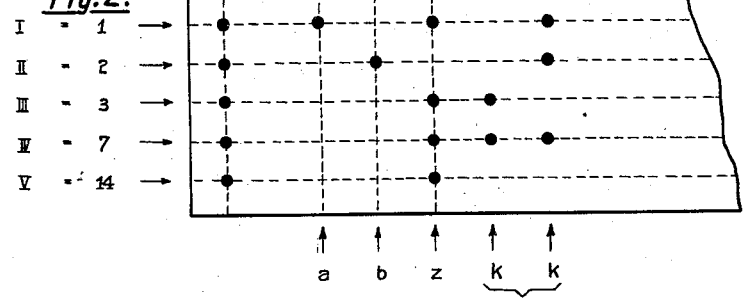
Fig. 2.
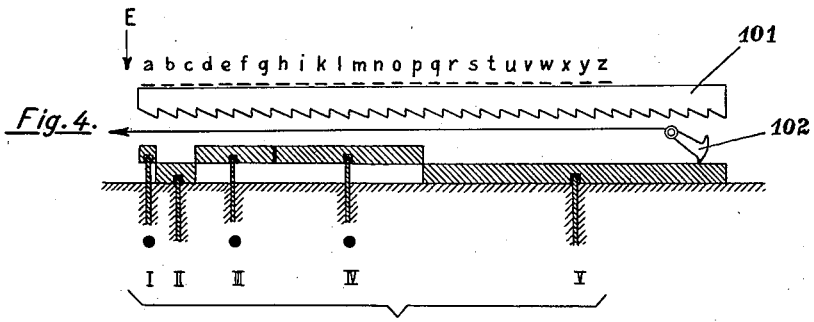
Fig. 3.
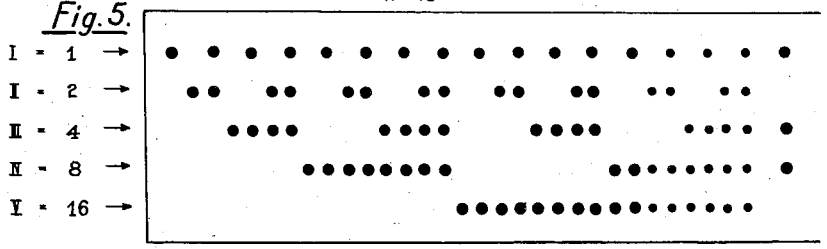
Fig. 4.
Fig. 5.
Inventor
Martin Lebeis Patented Apr. 8, 1924.

1,489,535

UNITED STATES PATENT OFFICE.

MARTIN LEBEIS, OF BERLIN-FRIEDENAU, GERMANY, ASSIGNOR, BY MESNE ASSIGNMENTS, TO NAAMLOOZE VENNOOTSCHAP MACHINA MAATSCHAPPIJ VOOR HANDEL EN INDUSTRIE, OF AMSTERDAM, NETHERLANDS.

DEVICE FOR THE AUTOMATIC OPERATION OF TYPEWRITERS AND THE LIKE.

Application filed June 4, 1923. Serial No. 643,360.

*To all whom it may concern:*

Be it known that I, MARTIN LEBEIS, a citizen of the German Republic, residing at Berlin-Friedenau, Germany, have invented certain Improvements Relating to Devices for the Automatic Operation of Typewriters and the like, for which I have filed applications in Germany on July 11th, 1921, and in Great Britain on April 14th, 1923, and of which the following is a specification.

Typewriters, type-printing telegraphs, statistical machines and the like are automatically operated by means of perforated ribbons or the like the apertures of which are ordinarily grouped arbitrarily according to mutual agreements. This arbitrary arrangement of apertures involves as a rule a complicated mechanism for operating the typewriter.

The object of the present invention is to provide a systematic grouping of the apertures by the employment of which the operating mechanism can be considerably simplified, and the invention consists in arranging the apertures in rows and grouping them transversely across said rows so that, when a certain numerical value is assigned to the apertures in each particular row, the added values of each group of apertures will be equal to the numerical position occupied by the type sign in a range of such signs.

By this arrangement a very simple mechanism will be sufficient for selecting the corresponding sign on the typewriter for printing.

Fig. 1 of the accompanying drawings is a diagram showing the letters of the alphabet together with the number of the position they occupy in the order, and Fig. 2, a diagram showing an example of aperture grouping to represent the letters.

Fig. 3 is a view showing mechanical elements for selecting the letters on the typewriter, the values of the aperture rows being different from that of Fig. 2.

Fig. 4 is a view of the mechanical elements in use, and

Fig. 5, a diagram showing the grouping of the apertures to represent the various letters of the alphabet according to the valuation system shown in Fig. 3.

In the system according to Fig. 2, five longitudinal rows of apertures are employed and these are given the values 1, 2, 3, 7 and 14 respectively. Letters and signs are represented on the ribbon either by single apertures or by transverse rows of apertures in different groupings. The number and the position of the apertures in the transverse rows are determined by the values of the longitudinal rows and by the number given to each particular letter or sign. If the letters of the alphabet, for instance, are numbered consecutively, as shown in Fig. 1, the apertures for any particular letter are grouped so that the values of their positions, when added, equal the number of the latter.

Thus, in the case of "z," whose number is 25, there will be apertures in the lines I, III, IV and V whose values $1+3+7+14=25$. The letter "a" is represented by a single aperture in the longitudinal row I, the letter "b" by a single aperture in the line II. When a large number of signs are in use, the valuation of the longitudinal rows should be chosen so that the greatest number of signs can be expressed in the smallest number of longitudinal rows. For this purpose it is essential that the number of each sign should only be obtainable by a single combination of apertures. In Fig. 2, for instance, the letter "k" whose number is 10, can be expressed either by the employment of the rows III and IV or the rows I, II and IV, the number 10 being obtained in either case. Thus one of these combinations would have to be discarded as superfluous.

An ideal valuation system is obtained if the values of the rows are increased in geometrical progression with 2 as the constant ratio, as shown in Fig. 5. In this case each transverse combination of apertures will represent a definite number, and the longitudinal rows can be utilized to their full extent, the possibilities being in each case $2^n$, where $n$ is the number of longitudinal rows employed.

The mechanical elements for operating the typewriter may take the form of bars, one for each longitudinal row, of a length corresponding to the value of the rows. This is shown in Fig. 3, each succeeding bar being twice the length of the preceding one or as long as the preceding bars added together plus the first bar. Fig. 4 shows the bars in operation and set for printing the letter "n" whose number is 13. A ratchet rack 101 carrying the types and having teeth which are spaced in conformity with the types, is operated by means of a reciprocating pawl 102 which slides on the bars. The bars are set in the usual manner, electrically or mechanically, by means of elements which are controlled by the perforated ribbon. The bars represented by apertures in the ribbon are raised so that the pawl 102, which normally is out of contact with the rack, is compelled to engage the latter and carry it along in the direction of the arrow while passing over the raised bars. In this instance, therefore, as the bars I, III and IV are raised, the rack 101 will be advanced by 13 teeth, and the letter "n" will be brought to the printing position at E.

In the case of a rotary machine with circular instead of longitudinal rows, the values would be expressed by angles instead of lengths.

I claim:—

1. In a device for the automatic operation of typewriters, type-printing telegraphs and the like, a selecting element having apertures arranged in rows and grouped transversely across said rows so that, when a certain numerical value is assigned to the apertures in each particular row, the added values of each group of apertures is equal to the numerical position occupied by a type sign in a range of such signs.

2. In a device for the automatic operation of typewriters, type-printing telegraphs and the like, a selecting element having apertures arranged in rows and grouped transversely across said rows so that, when values which increase in geometrical progression, are assigned to the apertures in the different rows, the added values of each group of apertures is equal to the numerical position occupied by a type sign in a range of such signs.

3. In a device for the automatic operation of typewriters, type-printing telegraphs and the like, a selecting element having apertures arranged in rows and grouped transversely across said rows so that, when a numerical value is assigned to the apertures in each particular row, the added values of each group of apertures is equal to the numerical position occupied by a type sign in a range of such signs, and a setting element for each row of apertures, said setting element being constructed so as to induce a setting movement corresponding to the numerical values of the respective rows of apertures.

MARTIN LEBEIS.